US008577484B2

(12) United States Patent
Moorer et al.

(10) Patent No.: US 8,577,484 B2
(45) Date of Patent: Nov. 5, 2013

(54) CUSTOMIZABLE MEDIA DEVICE

(75) Inventors: Seale Moorer, Westerville, OH (US);
William K. Virgin, Westerville, OH
(US); Chris Groce, Westerville, OH
(US); Tim McMahon, Westerville, OH
(US)

(73) Assignee: Exceptional Innovation, LLC,
Westerville, OH (US)

(*) Notice: Subject to any disclaimer, the term of this patent is extended or adjusted under 35 U.S.C. 154(b) by 1066 days.

(21) Appl. No.: 12/153,182

(22) Filed: May 14, 2008
(Under 37 CFR 1.47)

(65) Prior Publication Data
US 2009/0037008 A1   Feb. 5, 2009

Related U.S. Application Data

(63) Continuation-in-part of application No. 11/686,826, filed on Mar. 15, 2007, now Pat. No. 8,155,142, and a continuation-in-part of application No. 11/686,836, filed on Mar. 15, 2007, and a continuation-in-part of application No. 11/686,896, filed on Mar. 15, 2007, now Pat. No. 7,509,402, and a continuation-in-part of application No. 11/686,884, filed on Mar. 15, 2007, now Pat. No. 7,496,627, and a continuation-in-part of application No. 11/686,893, filed on Mar. 15, 2007, and a continuation-in-part of application No. 11/686,846, filed on Mar. 15, 2007, and a continuation-in-part of application No. 11/686,875, filed on Mar. 15, 2007, and a continuation-in-part of application No. 11/686,889, filed on Mar. 15, 2007.

(60) Provisional application No. 60/782,734, filed on Mar. 16, 2006, provisional application No. 60/782,596, filed on Mar. 16, 2006, provisional application No. 60/782,598, filed on Mar. 16, 2006, provisional application No. 60/782,635, filed on Mar. 16, 2006, provisional application No. 60/782,599, filed on Mar. 16, 2006, provisional application No. 60/782,600, filed on Mar. 16, 2006, provisional application No. 60/782,634, filed on Mar. 16, 2006, provisional application No. 60/782,595, filed on Mar. 16, 2006, provisional application No. 60/785,275, filed on Mar. 24, 2006, provisional application No. 60/793,257, filed on Apr. 20, 2006, provisional application No. 60/747,726, filed on May 19, 2006, provisional application No. 60/746,287, filed on May 3, 2006, provisional application No. 60/786,119, filed on Mar. 27, 2006, provisional application No. 60/857,774, filed on Nov. 9, 2006, provisional application No. 60/917,778, filed on May 14, 2007.

(51) Int. Cl.
*G06F 17/00* (2006.01)

(52) U.S. Cl.
USPC .............................................. 700/94

(58) Field of Classification Search
USPC .............................................. 700/94
See application file for complete search history.

(56) References Cited

U.S. PATENT DOCUMENTS

| 6,278,676 B1 | 8/2001 | Anderson et al. |
| 7,170,422 B2 | 1/2007 | Nelson et al. |

(Continued)

OTHER PUBLICATIONS

Microsoft Windows, Web Services on Devices (Dec. 13, 2006), http://msdn.microsoft.com/en-us/windows/hardware/gg463121.*

(Continued)

*Primary Examiner* — Andrew C Flanders
(74) *Attorney, Agent, or Firm* — Baker & Hostetler LLP

(57) ABSTRACT

A media system includes a network implemented with a Web Service for Device (WSD) protocol for enabling interpretable device to device interaction, a plurality of media devices connectable to the network and configured to perform a plurality of media functions, each media device being configured to perform at least one of the plurality of media functions, and a media host connectable to the network and configured to at least partially control the plurality of media functions, wherein the media host is directly connectable to at least one of the plurality of media devices and comprises a media interface customizable depending on a connection type of the at least one media devices to be connected thereto.

20 Claims, 21 Drawing Sheets

(56) References Cited

U.S. PATENT DOCUMENTS

| | | |
|---|---|---|
| 7,203,486 B2 | 4/2007 | Patel |
| 7,380,250 B2 | 5/2008 | Schechter et al. |
| 2003/0101304 A1 | 5/2003 | King et al. |
| 2004/0004810 A1 | 1/2004 | Kim |
| 2004/0267876 A1 | 12/2004 | Kakivaya et al. |
| 2005/0113021 A1 | 5/2005 | Gosieski, Jr. et al. |
| 2005/0131558 A1* | 6/2005 | Braithwaite et al. ............ 700/94 |
| 2005/0198188 A1 | 9/2005 | Hickman |
| 2005/0198304 A1 | 9/2005 | Oliver et al. |
| 2005/0232583 A1 | 10/2005 | Kubota |
| 2005/0262227 A1 | 11/2005 | Heller et al. |
| 2006/0053234 A1 | 3/2006 | Kumar et al. |
| 2006/0087792 A1* | 4/2006 | Ng et al. ........................ 361/152 |
| 2006/0106933 A1 | 5/2006 | Huang et al. |
| 2006/0155802 A1 | 7/2006 | He et al. |
| 2007/0053376 A1 | 3/2007 | Oshima et al. |
| 2007/0083679 A1 | 4/2007 | Kikuchi |
| 2007/0104332 A1 | 5/2007 | Clemens et al. |

OTHER PUBLICATIONS

Asus, P5W DH Deluxe Motherboard User guide (Jun. 2006), pp. xi-xiv.*

* cited by examiner

CUSTOMIZABLE MEDIA DEVICE

CROSS REFERENCE TO PRIOR APPLICATIONS

This application is a continuation-in-part of the following U.S. patent applications: U.S. patent application Ser. No. 11/686,826, entitled NETWORK BASED DIGITAL ACCESS POINT DEVICE, filed Mar. 15, 2007, to Seale Moorer, et al., and issued as U.S. Pat. No. 8,155,142; U.S. patent application Ser. No. 11/686,836, entitled INTERNET PROTOCOL BASED MEDIA STREAMING SOLUTION, filed Mar. 15, 2007, to Seale Moorer, et al.; U.S. patent application Ser. No. 11/686,896, titled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTION, AND EVENTING THAT IS CONTROLLABLE WITH A TOUCH-SCREEN DISPLAY, filed Mar. 15, 2007 and issued as U.S. Pat. No. 7,509,402, to Seale Moorer, et al.; U.S. patent application Ser. No. 11/686,884, entitled AUTOMATION CONTROL SYSTEM HAVING DIGITAL LOGGING, filed Mar. 15, 2007 and issued as U.S. Pat. No. 7,496,627, to Seale Moorer, et al.; U.S. patent application Ser. No. 11/686,893, entitled USER CONTROL INTERFACE FOR CONVERGENCE AND AUTOMATION SYSTEM, filed Mar. 15, 2007, to Seale Moorer, et al.; U.S. patent application Ser. No. 11/686,846, entitled DEVICE AUTOMATION USING NETWORKED DEVICE CONTROL HAVING A WEB SERVICES FOR DEVICES STACK, filed Mar. 15, 2007, to Seale Moorer, et al.; U.S. patent application Ser. No. 11/686,875, entitled AUTOMATION CONTROL SYSTEM HAVING A CONFIGURATION TOOL, filed Mar. 15, 2007, to Seale Moorer, et al.; and U.S. patent application Ser. No. 11/686,889, entitled AUTOMATION CONTROL SYSTEM HAVING DEVICE SCRIPTING, filed Mar. 15, 2007, to Seale Moorer, et al. These applications also claim priority to and the benefit of: Provisional Patent Application No. 60/782,734 filed on Mar. 16, 2006, entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTIONS, AND EVENTING THAT IS CONTROLLABLE WITH A TOUCH-SCREEN DISPLAY, to Seale MOORER et al.; Provisional Patent Application No. 60/782,596 filed on Mar. 16, 2006, entitled AUTOMATION CONTROL SYSTEM HAVING DIGITAL MEDIA STREAMING, to Seale MOORER et al.; Provisional Patent Application No. 60/782,598 filed on Mar. 16, 2006, entitled AUTOMATION CONTROL SYSTEM HAVING DIGITAL LOGGING, to Seale MOORER et al.; Provisional Patent Application No. 60/782,635 filed on Mar. 16, 2006, entitled AUTOMATION CONTROL SYSTEM HAVING A CONTROL PANEL, to Seale MOORER et al.; Provisional Patent Application No. 60/782,599 filed on Mar. 16, 2006, entitled AUTOMATION CONTROL SYSTEM HAVING A CONFIGURATION TOOL, to Seale MOORER et al.; Provisional Patent Application No. 60/782,600 filed on Mar. 16, 2006, entitled AUTOMATION CONTROL SYSTEM HAVING DEVICE SCRIPTING, to Seale MOORER et al.; Provisional Patent Application No. 60/782,634 filed on Mar. 16, 2006, entitled DEVICE AUTOMATION USING NETWORKED DEVICE CONTROL HAVING A WEB SERVICES FOR DEVICE STACK, to Seale MOORER et al.; Provisional Patent Application No. 60/782,595 filed on Mar. 16, 2006, entitled WIRELESS DIGITAL AMPLIFIER CONFIGURED FOR WALL MOUNTING, SHELF MOUNTING, AND THE LIKE, to Seale MOORER et al.; Provisional Patent Application No. 60/785,275 filed on Mar. 24, 2006, entitled AUTOMATION SYSTEM, to Seale MOORER et al.; Provisional Patent Application No. 60/793,257 filed on Apr. 20, 2006, entitled TOUCH SCREEN FOR USE WITH AUTOMATION SYSTEMS, to Seale MOORER et al.; Provisional Patent Application No. 60/747,726 filed on May 19, 2006, entitled COOLING DEVICE FOR A TOUCH SCREEN AND THE LIKE, to Seale MOORER et al.; Provisional Patent Application No. 60/746,287 filed on May 3, 2006, entitled HOME AUTOMATION SYSTEM AND THE LIKE, to Seale MOORER et al.; Provisional Patent Application No. 60/786,119 filed on Mar. 27, 2006, entitled HOME AUTOMATION PROGRAM CODE FOR SET TOP BOX OR SIMILAR CIRCUIT, to Steve CASHMAN; and Provisional Patent Application No. 60/857,774 filed Nov. 9, 2006, entitled PORTABLE MULTI-FUNCTIONAL MEDIA DEVICE, to Seale MOORER et al., all of which are hereby expressly incorporated by reference for all purposes as if fully set forth herein. This application further claims priority and the benefit thereof from a U.S. Provisional Application No. 60/917,778 filed on May 14, 2007, which is hereby incorporated by reference for all purposes as if fully set forth herein.

BACKGROUND

1. Field of the Disclosure

This disclosure relates to a media system that converges and automates a plurality of functions and operations of at least one media device or non-media device.

2. Related Art

Household, academic and/or business spaces typically have more than one media device, such as, e.g., a CD/DVD player, a portable media player, a radio frequency (RF) tuner, a preamplifier, a power amplifier, a speaker, a VCR, a DVR, a computer running a media player, a computer connected to some other source of audio or video media (e.g., Internet radio, satellite radio and the like), etc. Typically, a DVD player from one original equipment manufacturer (OEM) may be provided with its own remote control device and a TV set may be provided by an entirely different OEM with its own remote control device. Further, the same space may include a personal computer (PC) having a keyboard and a mouse, and yet another OEM's portable media player with its own control switches. While each media device is doing precisely what it was designed to do, each operates completely independent from the others. As a result, a user ends up going from one keypad or device to another keypad or device, or juggling a series of remote controls in order to control certain of the devices.

Since these media devices are not designed to communicate with each other or their communication is very limited, access to these media and non-media devices is limited by their physical locations. For example, it is difficult to play a digital audio file (such as, e.g., an MP3 file, a WMA file, etc.) saved in a PC hard disk drive in one room or area (such as, e.g., a child's bedroom) on speakers that are located in another room or area (such as, e.g., an entertainment room). Thus, in order for a user to enjoy music of his or her choice whenever and wherever he or she desires, each room must be equipped with all of the necessary media equipment and digital media content.

Further, the media and non-media devices, such as, e.g., an intercom system, an ambient lighting system, a security system, an HVAC system and the like, may not be designed to communicate with other devices. Thus, it may be difficult, if not impossible, to converge the media and non-media devices for common control for certain occasions. For example, in order to watch a movie, a user must turn on a TV, a DVD player and an audio amplifier by using three different control devices. Then the user must set the TV to receive a video signal from the DVD player, set the audio amplifier to receive an audio signal from the DVD player and use another control device to adjust the lighting of the room. Finally, the user must find and load a DVD into the DVD player that he or she desires to watch. Even with a universal remote controller, the user may need to go through almost the same amount of trouble as with the three different control devices, since the universal remote controller allows the user to control only one device at a time.

These media and non-media devices do not converge as described above because the media and non-media devices lack any ability to easily connect and effectively communicate with each other, much less allow for control by a single control device. Accordingly, there is a need for a flexible and versatile control device for controlling various functions and operations of media and non-media devices in a converged and automated manner.

SUMMARY

In one aspect of the disclosure, a media system includes a network implemented with a Web Service for Device (WSD) protocol for enabling interpretable device to device interaction, a plurality of media devices connectable to the network and configured to perform a plurality of media functions, each media device being configured to perform at least one of the plurality of media functions, and a media host connectable to the network and configured to at least partially control the plurality of media functions, wherein the media host is directly connectable to at least one of the plurality of media devices and comprises a media interface customizable depending on a connection type of the at least one media devices to be connected thereto.

The plurality of media devices may include at least one media source device configured to provide media data to the media system and at least one media destination device, which is configured to receive the media data.

The at least one media source device may include at least one of a RF tuner, a CD player, a VCR, a cable outlet, a cable box, a satellite receiver, a camcorder, a digital camera, a DVD player, a Blu-ray DVD player, a HD DVD player, a portable media player, a data storage, a telephone and the Internet.

The at least one media destination device may include at least one of a speaker system, a stereo system, a surround sound system, a monitor, a TV set, an image projection system, a data storage and a computer.

The media host may be further configured to control traffic of the media data from the at least one media source device to the at least one media destination device.

The media interface may include a media plate having a first group of connectors for at least one of receiving and outputting the media data. The media plate may be replaceable to another media plate comprising a second group of connectors for at least one of receiving and outputting the media data.

Each of the first group of connectors and the second group of connectors may include at least one of an audio connector, a video connector and a multiple signal connector.

The audio connector may include at least one of a Banana connector, a five-way binding posts with a banana plug, a Fahnestock clip, a DB25 connector, a DIN connector, a mini-DIN connector, an RCA connector, a Speakon connector, a TRS connector, an XLR connector, an ADAT connector, an AES/EBU connector and a S/PDIF connector.

The video connector may include at least one of a component video connector, a composite video connector, a DB13W3 connector, a DMS-59 connector, a Musa connector, a PAL connector, a SCART connector, an S-Video connector, an SDI connector, a VGA connector, a Mini-VGA connector, a BNC connectors, a DVI connector and a mini-DVI connector.

The multiple signal connector may include at least one of a DisplayPort digital connector, an F connector, a HDMI connector, a SCART connector, a TRS connectors.

The media system may further include a plurality of non-media devices connectable to the network and configured to perform a plurality of non-media functions, each non-media device configured to perform at least one of the plurality of non-media functions. The media host may be further configured to converge the plurality of media functions and the plurality of the non-media functions. The plurality of non-media devices may include at least one of an intercom system, an ambient lighting system, a security system and a HVAC system.

According to another aspect of the disclosure, a media host device includes a media processing system configured to process media data, a housing comprising the media processing system, and a media interface unit configured to receive and output the media data from and to at least one media device, the media interface unit being customizable depending on the at least one media device.

The media interfacing unit may be customizable depending on a number and connection types of the at least one media device. The media interfacing unit comprises a first media plate comprising a first group of media connectors for at least one of receiving and outputting the media data. The media plate may be replaceable to a second media plate comprising a second group of media connectors for at least one of receiving and outputting the media data.

The housing may include a flange configured to detachably and sequentially engage the first media plate and the second media plate. The flange may include a plurality of first connection openings and each of the first media plate and the second media plate comprises a plurality of second connection openings arranged corresponding to the first connections openings. Each of the first media plate and the second media plate may be attachable to the flange by a plurality of screws inserted through the plurality of first connection openings and the plurality of second connection openings.

Each of the first group of the media connectors and the second group of the media connectors may include at least one of an audio connector, a video connector and a multiple signal connector.

The audio connector may include at least one of a Banana connector, a five-way binding posts with a banana plug, a Fahnestock clip, a DB25 connector, a DIN connector, a mini-DIN connector, an RCA connector, a Speakon connector, a TRS connector, an XLR connector, an ADAT connector, an AES/EBU connector and a S/PDIF connector.

The video connector may include at least one of a component video connector, a composite video connector, a DB13W3 connector, a DMS-59 connector, a Musa connector, a PAL connector, a SCART connector, an S-Video connector, an SDI connector, a VGA connector, a Mini-VGA connector, a BNC connectors, a DVI connector and a mini-DVI connector.

The multiple signal connector may include at least one of a DisplayPort digital connector, an F connector, an HDMI connector, a SCART connector, a TRS connector.

The media processing system may include a system board, a microprocessor connected to the system board, a memory connected to the system board, a data storage connected to the system board, and a network interface connected to the system board.

Additional features, advantages, and embodiments of the disclosure may be set forth or apparent from consideration of the following detailed description, drawings, and claims. Moreover, it is to be understood that both the foregoing summary of the disclosure and the following detailed description are mere examples and intended to provide further explanation without limiting the scope of the disclosure as claimed.

BRIEF DESCRIPTION OF THE DRAWINGS

The accompanying drawings illustrate embodiments of the disclosure, and together with the detailed description serve to explain teaching principles of the disclosure. No attempt is made to show structural details of the disclosure in any more detail than may be necessary to understand teaching principles and elucidate examples of various ways in which it may be practiced. In the drawings.

DETAILED DESCRIPTION

Figure 1:
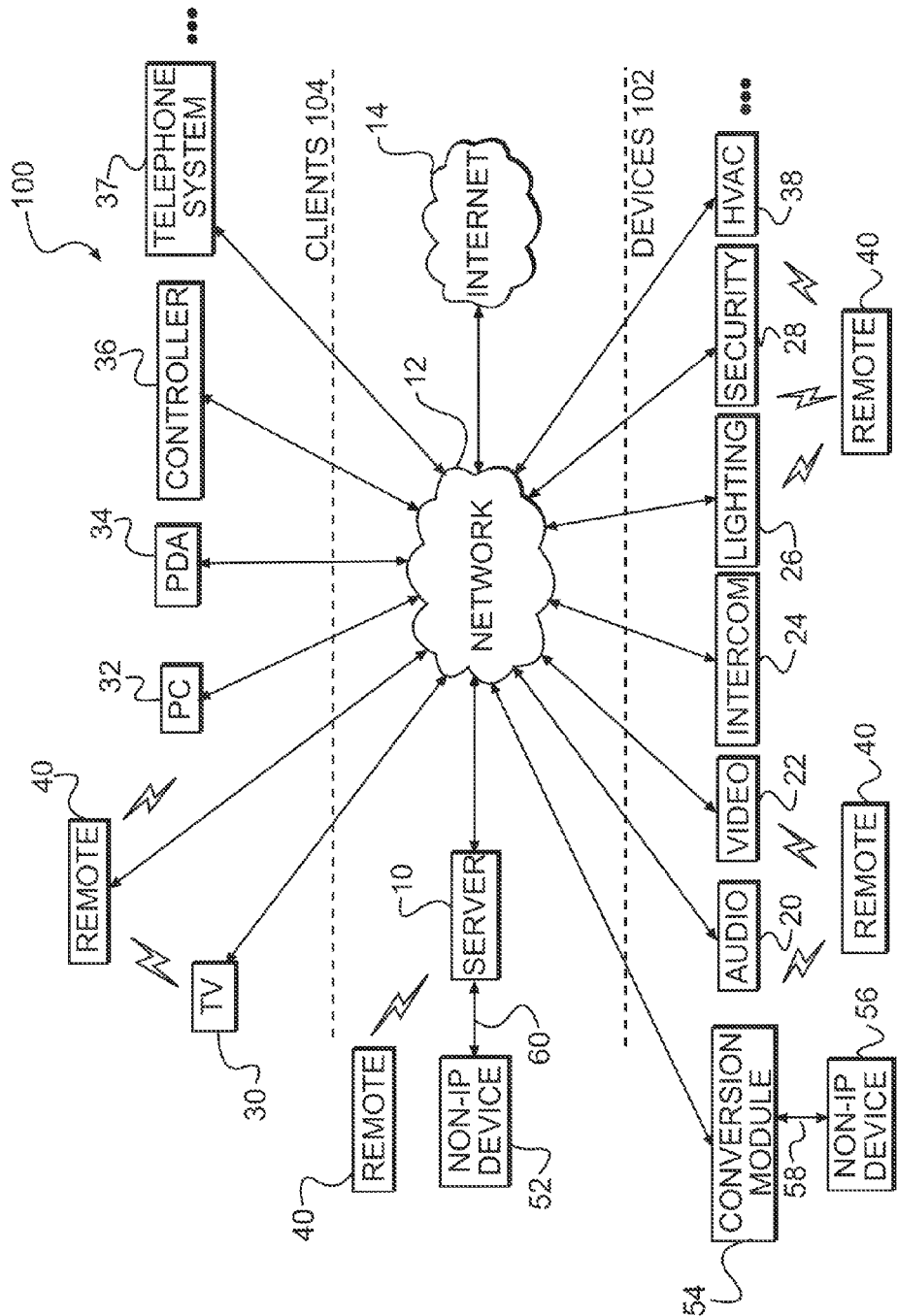
FIG. 1 shows a conceptual overview of a convergence and automation solution (CAS), constructed in accordance with the disclosure.

The embodiments of the disclosure and various features thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments. Descriptions of well-known components and processing techniques may be omitted so as to not unnecessarily obscure teaching principles of embodiments described herein. The examples used herein are intended merely to facilitate an understanding of ways in which embodiments of the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

FIG. 1 shows a conceptual overview of a convergence and automation solution (CAS) 100 constructed in accordance with an embodiment of the disclosure. The CAS 100 may be a combination of hardware and/or software. The hardware may include a server 10, a plurality of devices 102, a plurality of clients 104 and/or the like. The server 10, the devices 102 and the clients 104 may be connected to a network 12, which may be an Internet protocol (IP) based wired and/or wireless network, such as, e.g., a personal area network (PAN), a local area network (LAN), a campus area network (CAN), a metropolitan area network (MAN), a wide area network (WAN) and/or the like. The network 12 may be connected to the Internet 14.

The server 10 may be any type of computer connectable to the network 12, including, but not limited to, for example, a personal computer (PC), a workstation, a mainframe computer or the like, as the skilled artisan will readily appreciate, without departing from the scope or spirit of the disclosure. The devices 102 may include any type of electronic devices configured to perform one or more functions, including, but not limited to, for example, an audio device 20, a video device 22, an intercom system 24, an ambient lighting system 26, a security system 28, a heating, ventilating and air conditioning (HVAC) system 38, and/or the like.

The clients 104 may be configured to provide a user with control over one or more of the devices 102 and/or other clients 104. The clients 104 may include, but are not limited to, for example, a TV 30, a PC 32, a personal digital assistant (PDA) 34, a controller 36, a telephone system 37 and/or the like. The controller 36 may include, but is not limited to, for example, a control panel, a gaming console (e.g., X-Box™, Playstation Portable™ and/or the like), and/or the like. Some of the clients 104 may be configured to perform one or more functions. For example, the user may use the TV 30 to watch TV programs or DVD movies, or to view a control menu when controlling the devices 102.

The clients 104 may further include one or more remote controllers 40 to control the devices 102 and/or the clients 104; or the remote controller 40 may be configured to be a client 104. The user may use the remote controller 40 to listen to music, watch and/or record video, enjoy family photographs and home movies, as well as adjust the lighting, secure the home, adjust the ambient temperature, distribute music throughout the house, check surveillance cameras and the like.

In an embodiment, the CAS 100 may be configured to interact with other devices that are not equipped with an IP-based communication interface, such as, for example, a window shade automation device, a light control device, an audio device, a video device and/or the like. For example, the CAS 100 may be configured to interact with non-IP devices 52, 56 using non-IP based communication channels 60, 58, respectively. The non-IP based communication channels 60, 58 may include, but are not limited to, for example, a serial port, a parallel port, a USB port, a COM port, a telephone line, a power line and/or the like.

The non-IP device 52, located proximate to the server 10, may be directly connected to the server 10 via the non-IP based communication channel 60. For the non-IP device 56, which may be located further away from the server 10, a link or conversion module 54 may be connected to the non-IP device 56 via the non-IP based communication channel 58 to connect the non-IP device 56 to the network 12. For example, the conversion module 54 may provide the non-IP device 56 with an Ethernet connection to enable IP based communications with the network 12. The conversion module 54 may provide more than one non-IP based communication connection, depending on, e.g., a particular application, as the skilled artisan will readily appreciate. For example, the conversion module 54 may include one or more of a serial port, a parallel port, a USB port, a COM port, a telephone line, a power line and the like. Accordingly, the non-IP device 56 may communicate with the server 10, the devices 102 and/or the clients 104 via network 12 and operate as one of the devices 102.

The software (e.g., application) may enable the hardware such as the server 10, the devices 102 and the clients 104 to communicate with each other despite different proprietary languages and/or communication protocols that may be used by each of the server 10, the devices 102 or the clients 104. Thus, the user may be provided with control over most or all of the hardware, including the server 10, the devices 102, and the clients 104 in the CAS 100 from the clients 104. The application may operate the CAS 10 such that the server 10, the devices 102 and the clients 104 may communicate with each other to send instructions and receive feedback. For example, the software may integrate centralized device control into a PC-based media environment (such as, e.g., a Microsoft Media Center™ environment) that may store, organize and play digital media content.

The software may be implemented with a Web Service (WS), a platform independent software system designed to support interoperable machine to machine interaction over the network 12. For example, U.S. Patent Publication No. 2007/0225865, titled "DEVICE AUTOMATION USING NETWORKED DEVICE CONTROL HAVING A WEB SERVICE FOR DEVICE STACK," which is incorporated herein by reference in its entirety, discloses a Web Service for Device (WSD) stack for use in the CAS 100 in order to enable the server 10, the clients 104 and the devices 102 running on any platform and written in any computer language to communicate with each other without needing to know how various tasks are accomplished.

Figure 2:
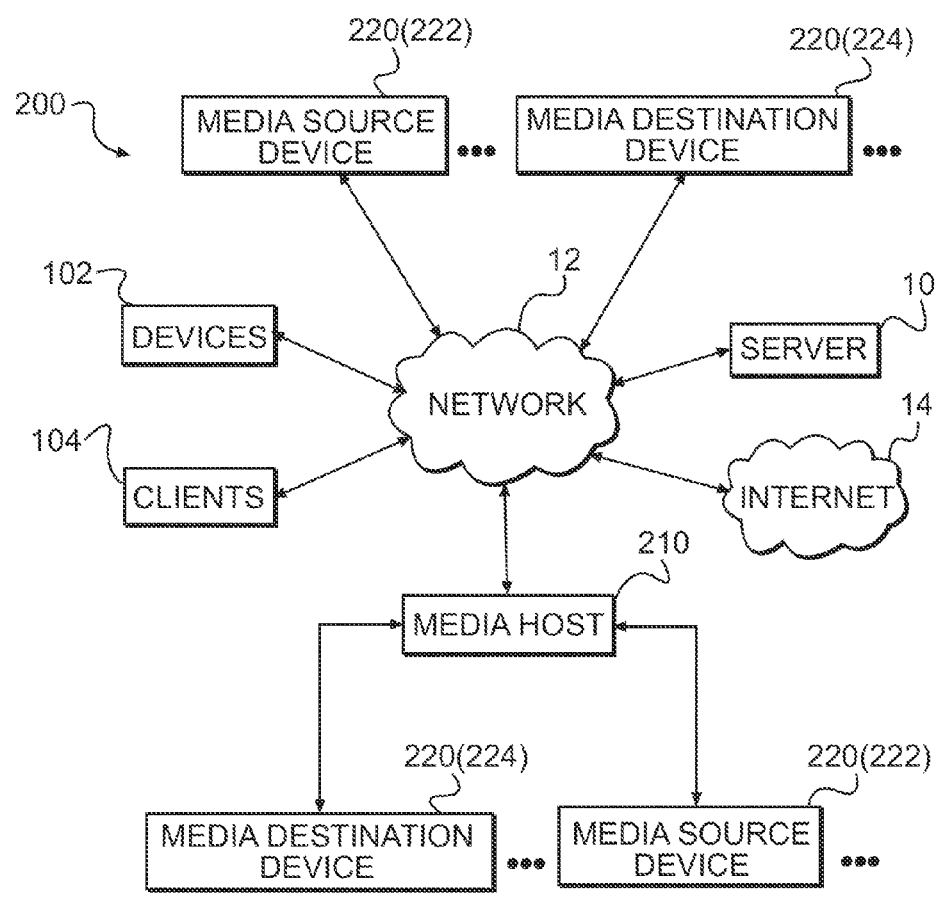
FIG. 2 shows a conceptual overview of a media system, constructed in accordance with the disclosure.

While the CAS 100 shown in FIG. 1 has been implemented for converging and automating the functions and operations of media devices and non-media devices, the CAS 100 may be implemented with emphasis on specific functionality, such as, e.g., media functionality or the like. For example, FIG. 2 shows a conceptual overview of a media system 200 for converging and automating media functions and operations of a plurality of media devices, constructed in accordance with an embodiment of the disclosure. Similar to the CAS 100 shown in FIG. 1, the media system 200 may be a combination of hardware and software. The hardware may include a media host 210, a plurality of media devices 220 and/or the like. The plurality of media devices 200 may include a plurality of media source devices 222, a plurality of media destination devices 224 and/or the like.

The media host 210 and the media devices 220 may be connected to the network 12, which may be IP based as mentioned above. The network 12 may be connected to the Internet 14. The media host 210 may be configured to interface the media devices 220 directly and/or indirectly via the network 12. The media system 200 may further include a server 10, one or more devices 102 and/or one or more clients 104, each of which may be connected to the network 12.

The software may be implemented with the Web Service (WS) to support interoperable machine to machine interaction among the media host 210, the media devices 220 and/or the like over the network 12. The network 12 may be implemented with the WSD protocol stack to provide the user with control over most or all of the hardware, including the media host 210, the media devices 220 and/or the like.

The media source devices 222 may include any type of electronic devices capable of providing media data (e.g., an audio data, a video data, a multiple (audio/video) data and/or the like) to the media system 200, including, but not limited to, for example, a radio frequency (RF) tuner, a CD player, a VCR, a cable outlet, a cable box, a satellite receiver, a camcorder, a digital camera, a DVD player, a Blu-ray DVD player, a HD DVD player, a portable media player, a data storage, a telephone, the Internet and/or the like.

The media destination devices 224 may include any type of electronic devices configured to receive the media data and perform an operation (e.g. playing, editing, processing, storing and/or the like) based on the received media data, including, but not limited to, for example, a speaker system, a stereo system, a surround sound system, a display, a TV set, an image projection system, a data storage and a PC.

Similar to the server 10 shown in FIG. 1, the media host 210 may be configured to converge and automate the functions and operations of the media devices 220. Further, the media host 210 may be configured to control traffic of the media data within the media system 200. For example, the media host 210 may instruct a stereo system in a room to retrieve and play an MP3 file stored in a PC in another room. While the media host 210 may interface the media devices 220 via the network 12, the media host 210 may directly interface one or more media devices 220 to receive and/or output media data from and/or to the media devices 220. Furthermore, the media host 10 may be configured to replace the server 10 and take complete control over the devices 102 and the clients 104.

Figure 3:
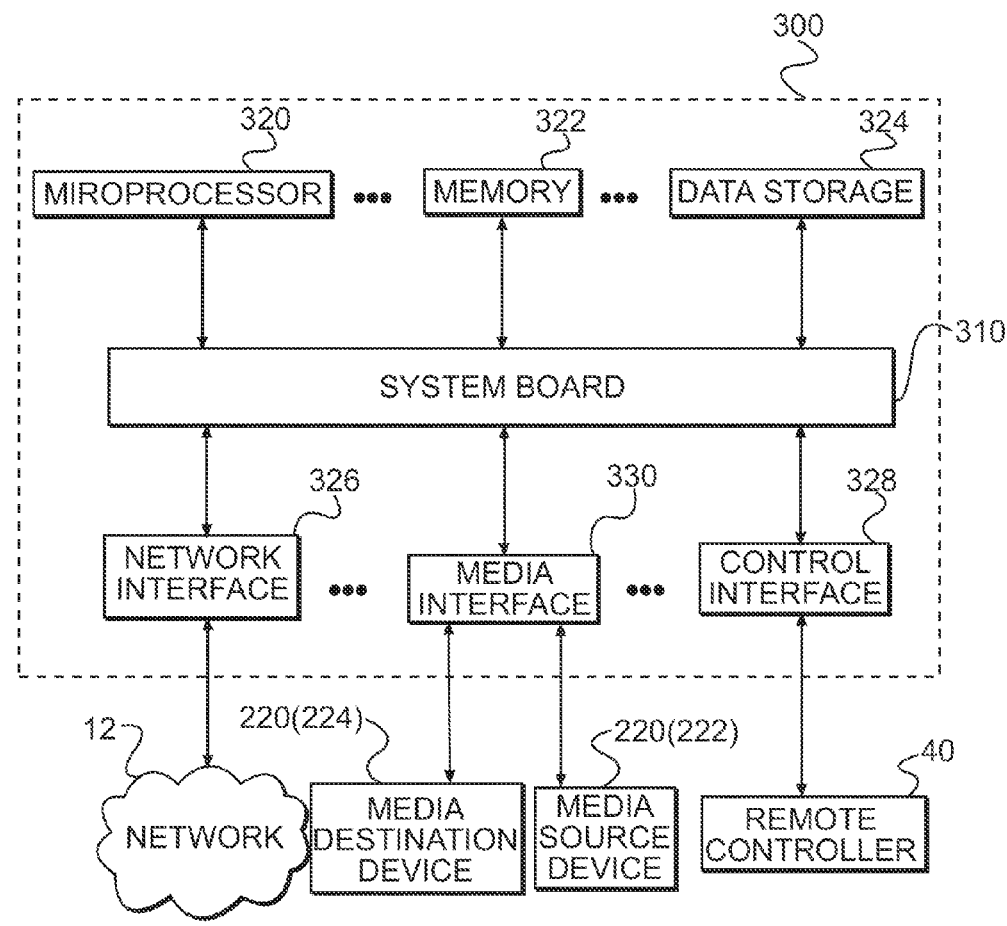
FIG. 3 shows a block diagram of a media control device, constructed in accordance with an embodiment of the disclosure.

FIG. 3 shows a conceptual overview of a media control device 300 for controlling a plurality of media devices, processing media data and/or the like, constructed in accordance with an embodiment of the disclosure. The media control device 300 may be used as, but not limited to, the media host 210, shown in FIG. 2. The media control device 300 may be built by assembling various components, such as, but not limited to, a system board 310, a microprocessor 320, a memory 322, a data storage 324, a network interface 326, a control interface 328, a media interface 330 and/or the like. The microprocessor 320, the memory 322, the data storage 324, the network interface 326, the control interface 328 and the media interface 330 may be connected to the system board 310 for controlling a plurality of media devices, processing media data and/or the like.

The system board 310 may include, but is not limited to, for example, an ATX motherboard, a micro ATX motherboard and/or the like. The microprocessor 320 may include, but is not limited to, for example, an Intel™ or an AMD™ microprocessor and the like. The memory 322 may include, but not limited to, for example, a DRAM and/or the like. The data storage 324 may include, but is not limited to, for example, one or more hard disk drives and/or the like. The network interface 326 may be configured to provide a network connection to the network 12. The network interface 326 may include, but is not limited to, for example, a 10/100/1000 Base-T Ethernet RJ-45 jack and/or the like. The control interface 328 may include, but not limited to, for example, an RF receiver configured to communicate with, for example, a remote controller 40, a wireless RF keyboard (not shown) and/or the like.

The media interface 330 may be configured to receive and/or output media data from and/or to the media devices 220 (e.g., a media source device 222, a media destination device 224 and/or the like) directly connected thereto. Further, the media interface 330 may be configured to process the media data. For example, the media interface 330 may include, but not limited to, for example, a graphic card (e.g., an Nvidia™ or ATI video card and/or the like), for processing video data stored in the data storage 324 and outputting the processed video data to a computer monitor, a TV set or the like. The media interface 330 may further include one or more media connectors to receive and/or output the media data from and/or to the media devices 220. The media interface 330 may be customizable depending on media connection types of the media devices 220 to be directly connected thereto. The media interface 330 may include a media plate, which is described below in detail.

Figure 4:
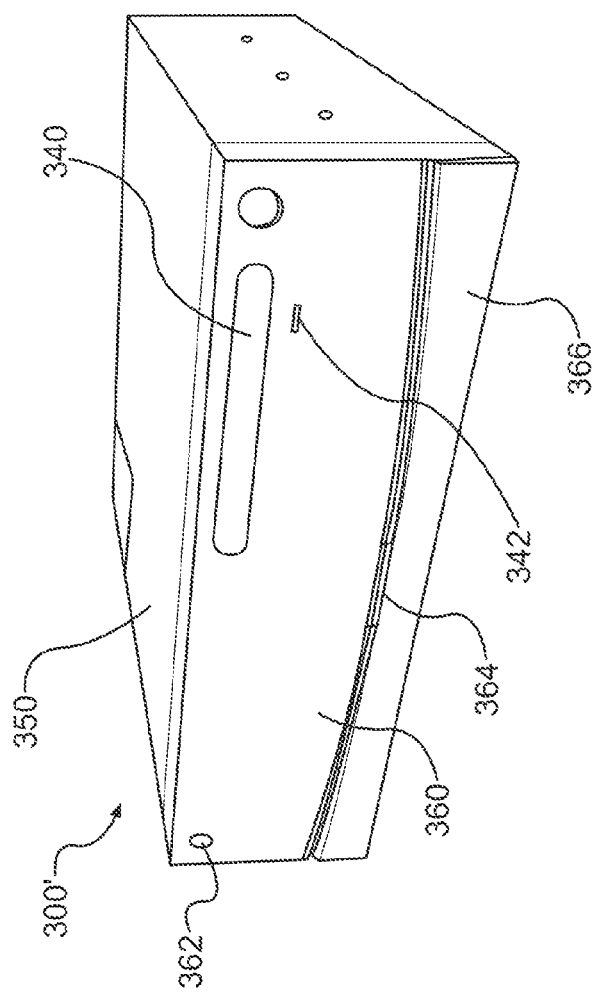
FIG. 4 shows a perspective view of the media control device implemented as a set-top unit, constructed in accordance with the disclosure.

FIG. 4 shows a perspective view of the media control device 300 configured in a set-top unit 300', constructed in accordance with an embodiment of the disclosure. The media control device 300' may include a housing 350 configured to cover the system board 310, the microprocessor 320, the memory 322, the data storage 324, the network interface 326, the control interface 328, the media interface 330 and/or the like. The housing 350 may include a front panel 360, which may include a power button 362, a power LED 364, a front door 366 and/or the like. In an embodiment, the media control device 300' may be configured such that opening of the door 366 may expose various connectors, such as, for example, one or more USB ports (not shown), one or more media connectors (not shown), and/or the like. The media control device 300' may further include an optical storage device 340, such as, for example, a DVD drive, a Blu-ray DVD drive or the like, and the front panel 360 may have an eject button 342 for the optical storage device 340.

Figure 5:
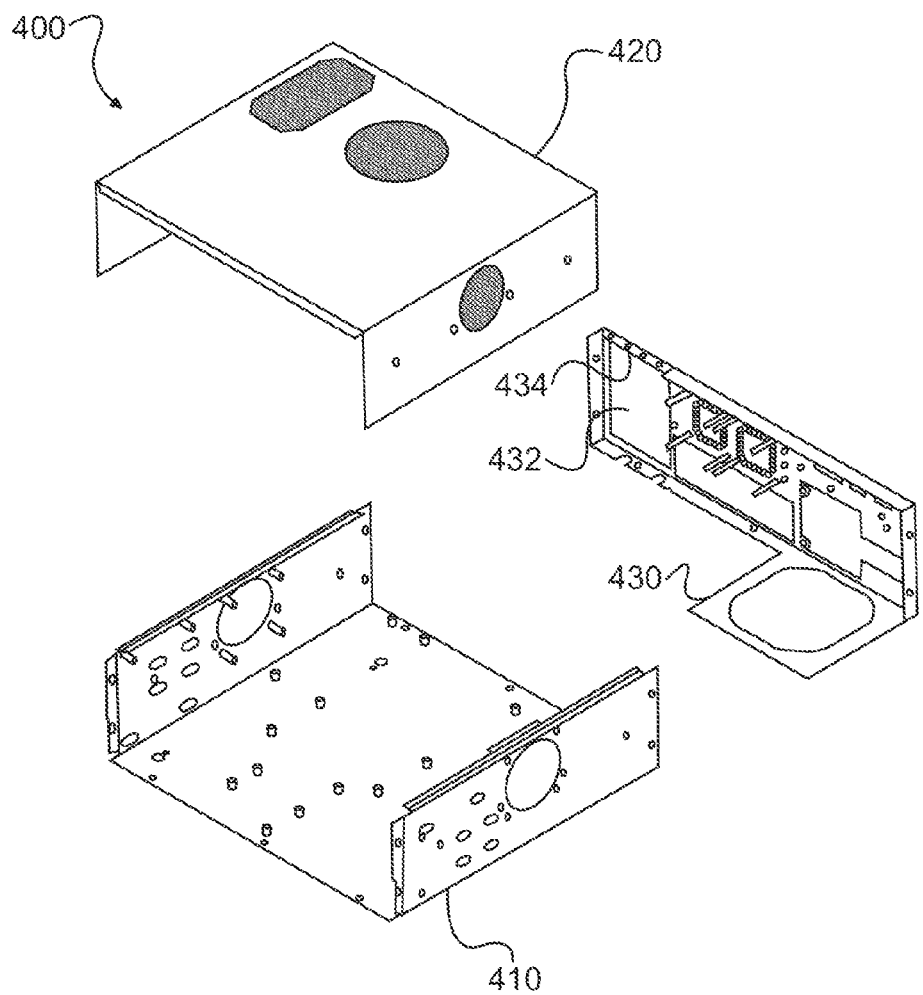
FIG. 5 shows an exploded view of a housing of the media control device, constructed in accordance with the disclosure.
Figure 6:
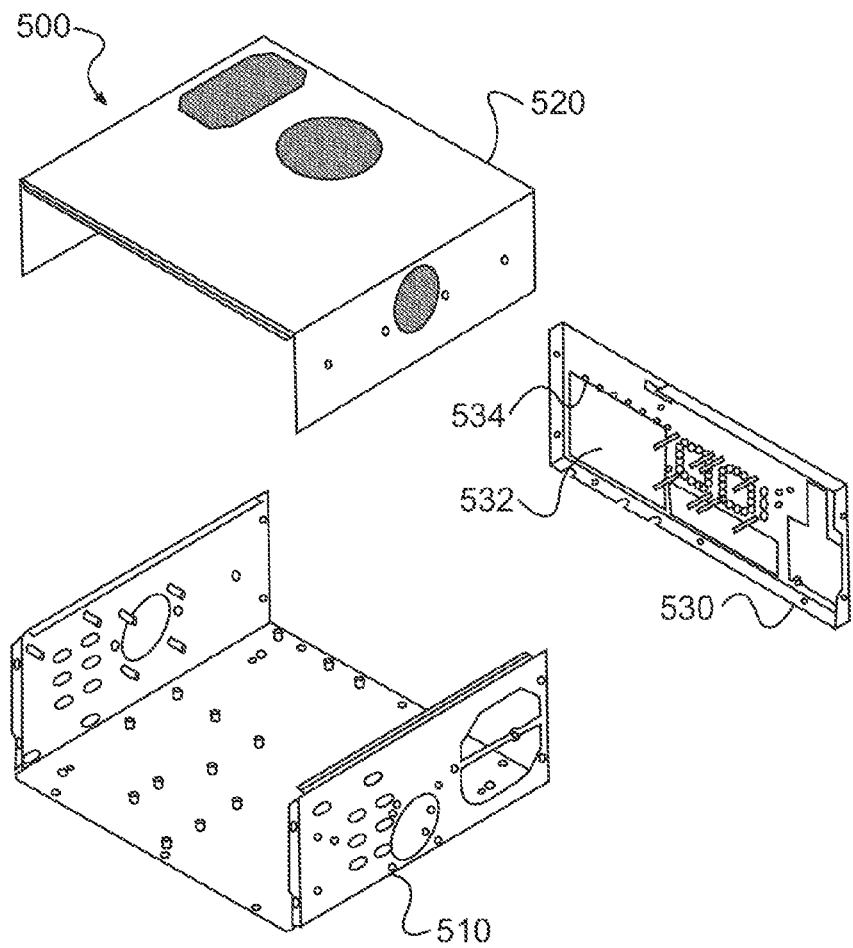
FIG. 6 shows an exploded view of another housing of the media control device, constructed in accordance with the disclosure.

The media control device 300 may be constructed in a different size, shape and configuration. For example, the media control device 300 may be configured as a rack-mount unit. For example, FIG. 5 shows a partial exploded view of a housing 400 of the media control device 300 configured as a three-space rack-mount unit, constructed in accordance with an embodiment of the disclosure. FIG. 6 shows another partial exploded view of a housing 500 of the media control device 300 configured as a four-space rack-mount, constructed in accordance with an embodiment of the disclosure.

In FIG. 5, the housing 400 may be constructed by assembling various parts, such as, but not limited to, a body tray 410, a cover 420, a back panel 430, a front panel (not shown) and/or the like. The back panel 430 may have an opening 432 and a plurality of connection holes (or openings) 434 formed around the opening 432 for installing, for example, the media interface 330 (shown in FIG. 3).

Similarly, in FIG. 6, the housing 500 may be constructed by assembling various parts, such as, but not limited to, a body tray 510, a cover 520, a back panel 530, a front panel (not shown) and/or the like. The back panel 530 may have an opening 532 and a plurality of connection holes (or openings) 534 formed around the opening 532 for installing, for example, the media interface 330 (shown in FIG. 3).

Figure 7A:
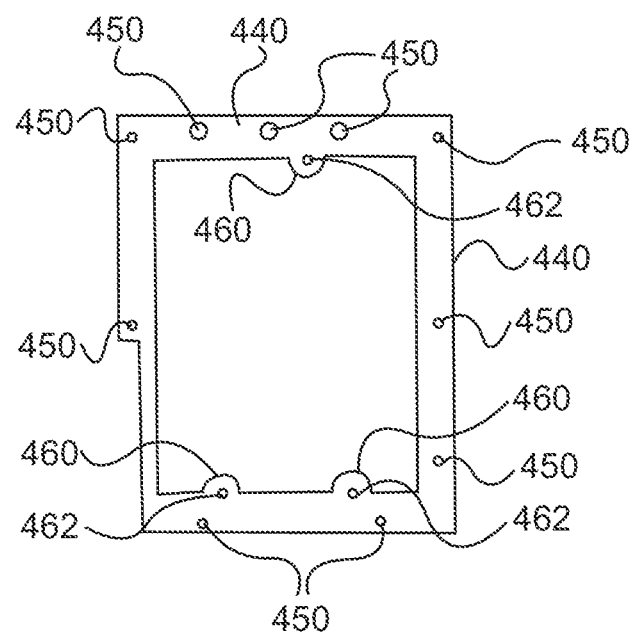
FIGS. 7A and 7B show examples of flanges configured to be attached to the housings shown in FIGS. 5 and 6, respectively, constructed in accordance with the disclosure.

FIG. 7A shows a flange 440 which may be attached to the back panel 430 of the housing 400 shown in FIG. 5, constructed in accordance with an embodiment of the disclosure. The flange 440 may include a plurality of first connection holes (or openings) 450, a plurality of second connection holes (or openings) 462 formed on a plurality of protruded portions 460. The first connection holes 450 may be formed corresponding to the connection holes 434 of the back panel 430 (shown in FIG. 4). The flange 440 may be attached to the back panel 430 by driving (or inserting) a plurality of screws 436 (shown in FIG. 8A) through the first connection holes 450 of the flange 440 and the connection holes 434 of the back panel 430.

Figure 7B:
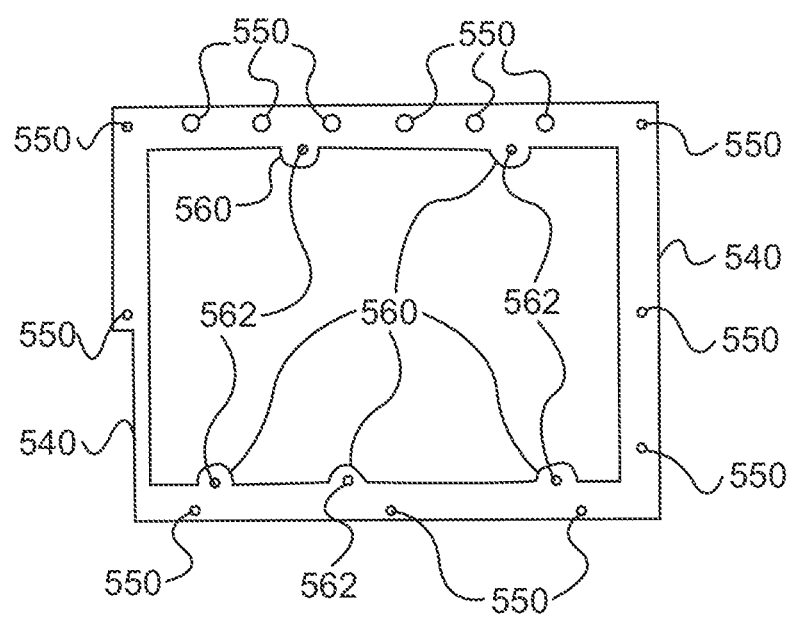

FIG. 7B shows a flange 540 which may be attached to the back panel 530 of the housing 500 shown in FIG. 5, constructed in accordance with an embodiment of the disclosure. Similar to the flange 440 shown in FIG. 7A, the flange 540 may include a plurality of first connection holes (or openings) 550, a plurality of second connection holes (or openings) 562 formed on a plurality of protruded portions 560. The first connection holes 550 may be formed corresponding to the connection holes 534 of the back panel 530 (shown in FIG. 5). The flange 540 may be attached to the back panel 530 by driving (or inserting) a plurality of screws 536 (shown in FIG. 8B) through the first connection holes 550 of the flange 540 and the connection holes 534 of the back panel 530.

Figure 8A:
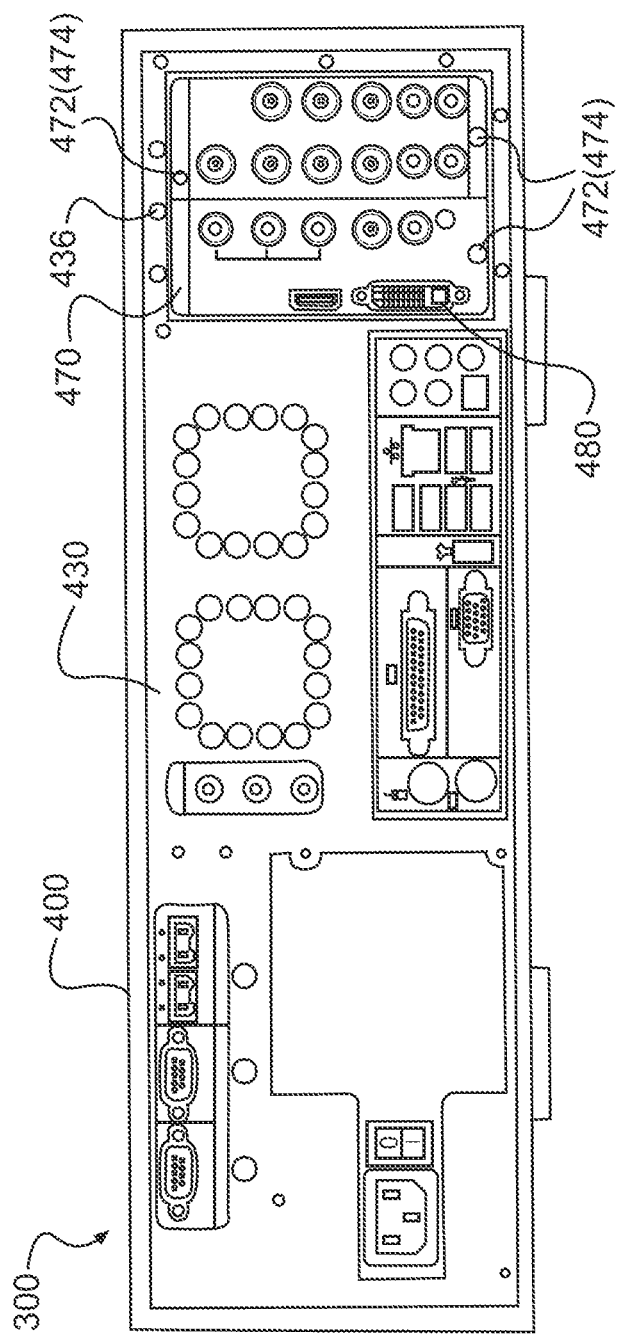
FIGS. 8A and 8B show examples of alternative rear views of the media control device, constructed in accordance with the disclosure.

FIG. 8A shows a rear view of the media control device 300 (shown in FIG. 3) constructed with the three-space rack-mount unit 400 (shown in FIG. 5). As seen, the media control device 300 may include a media plate 470, which may include one or more media connectors 480. The media plate 470 may have a plurality of connection holes (or openings) 472 formed corresponding to the second connection holes 462 of the flange 440 shown in FIG. 7A. The media plate 470 may be attached to the flange 440 by driving (or inserting) a plurality of screws 474 through the connection holes 472 of the media plate 470 and the second connection holes 462 of the flange 440.

Figure 8B:
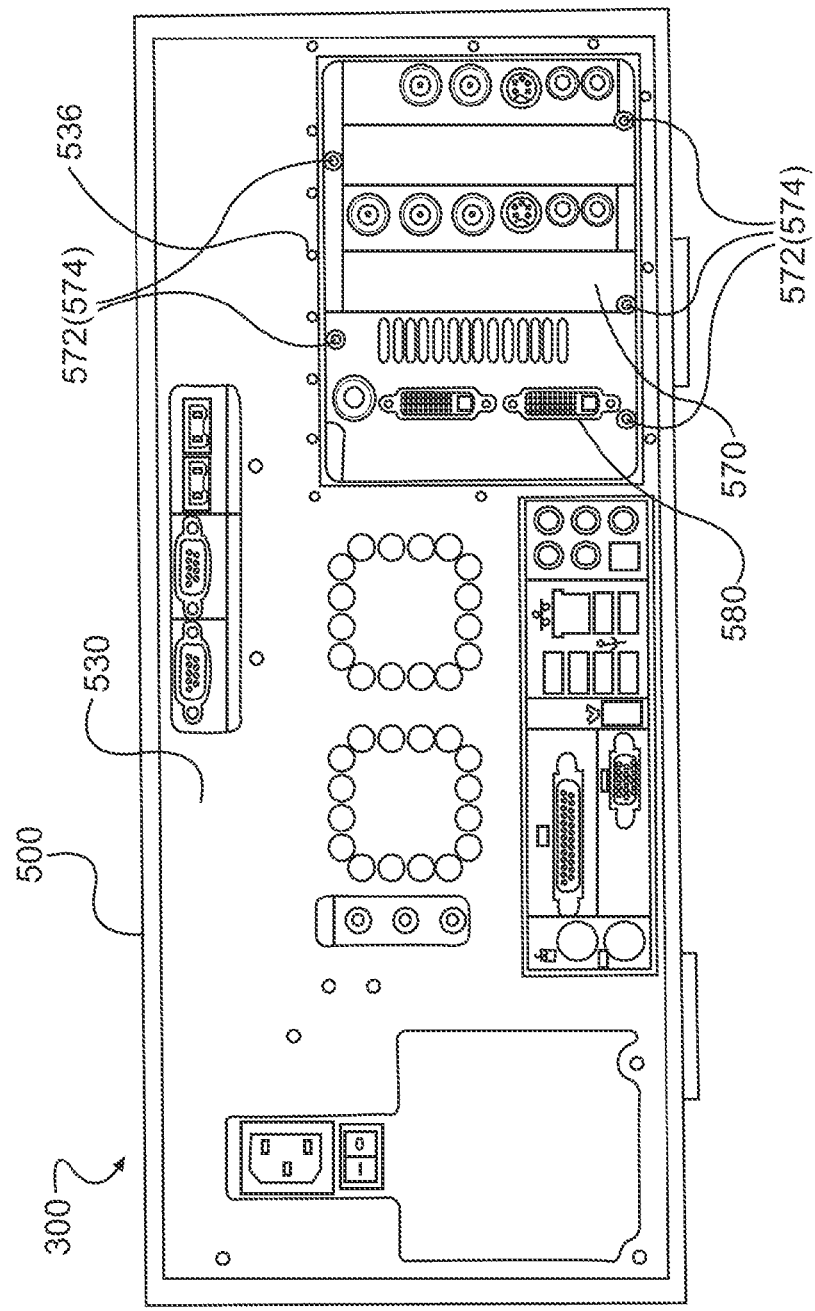
Figure 9A:
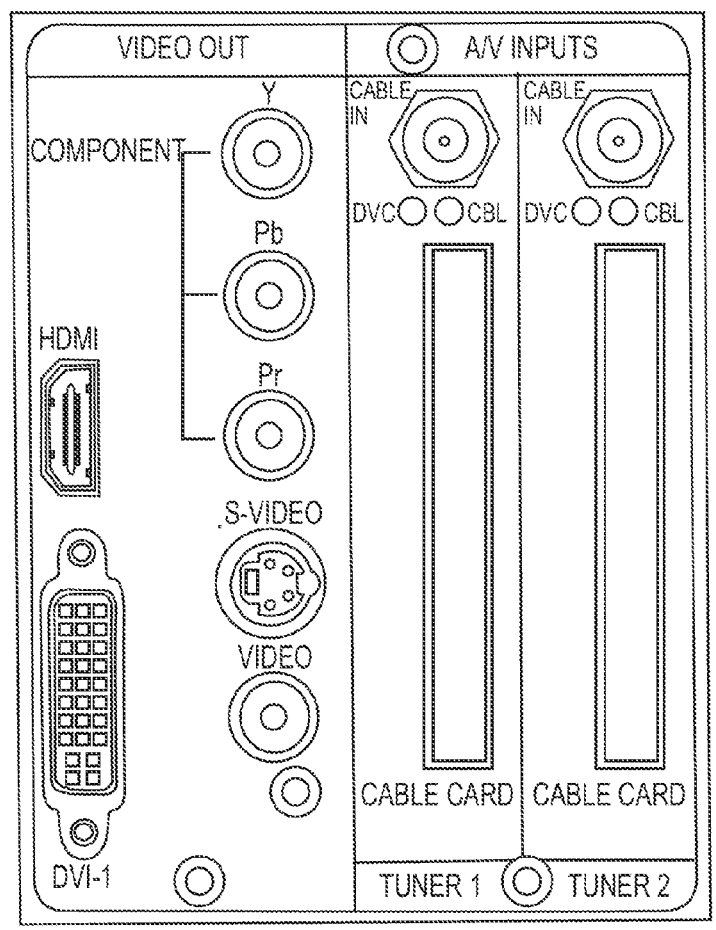
FIGS. 9A, 9B, 9C, 9D, 9E, 9F show various examples of a media plate for the media control device, constructed in accordance with the disclosure.
Figure 9B:
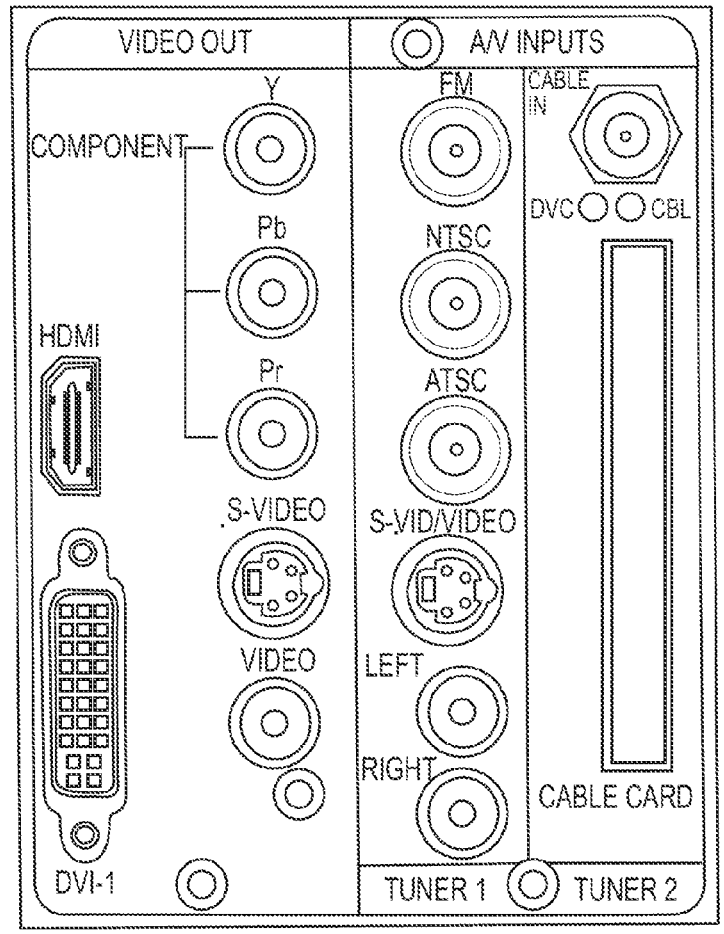
Figure 9C:
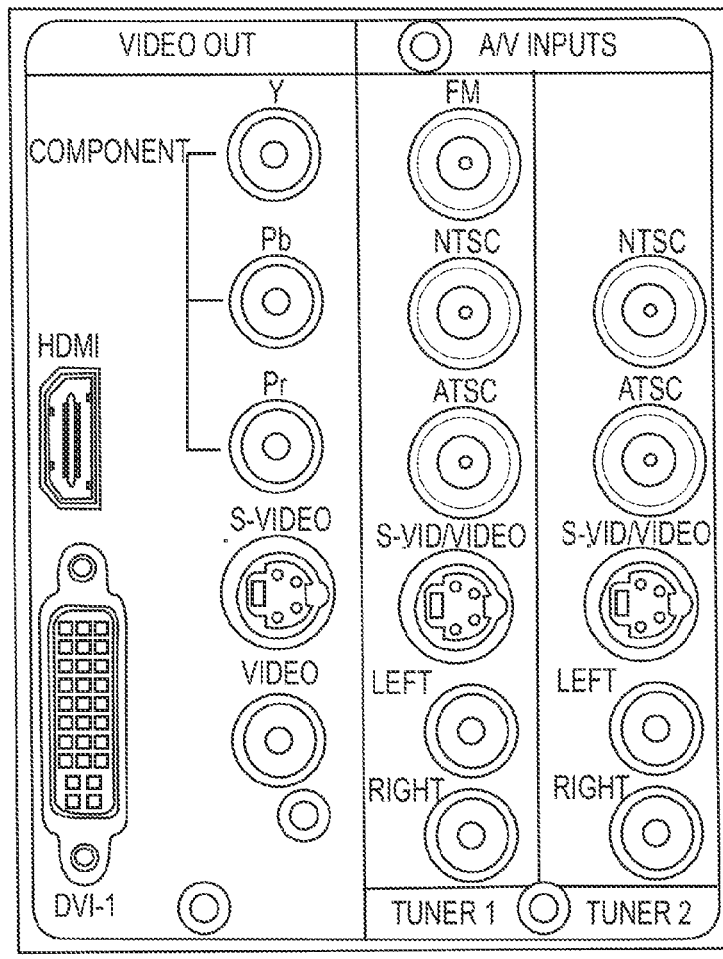
Figure 9D:
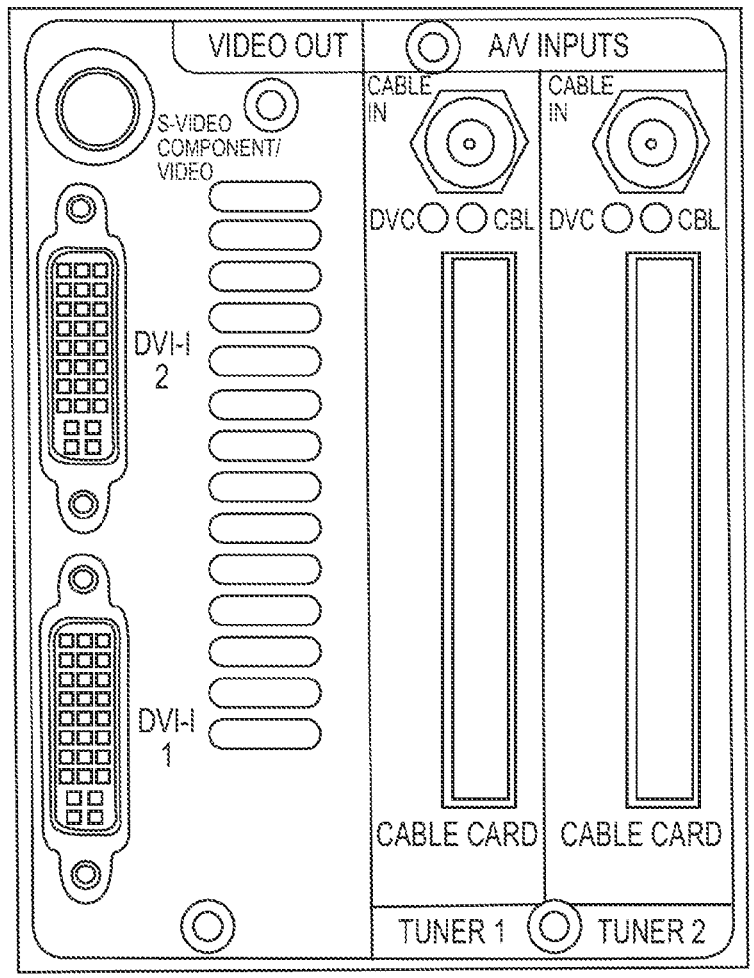
Figure 9E:
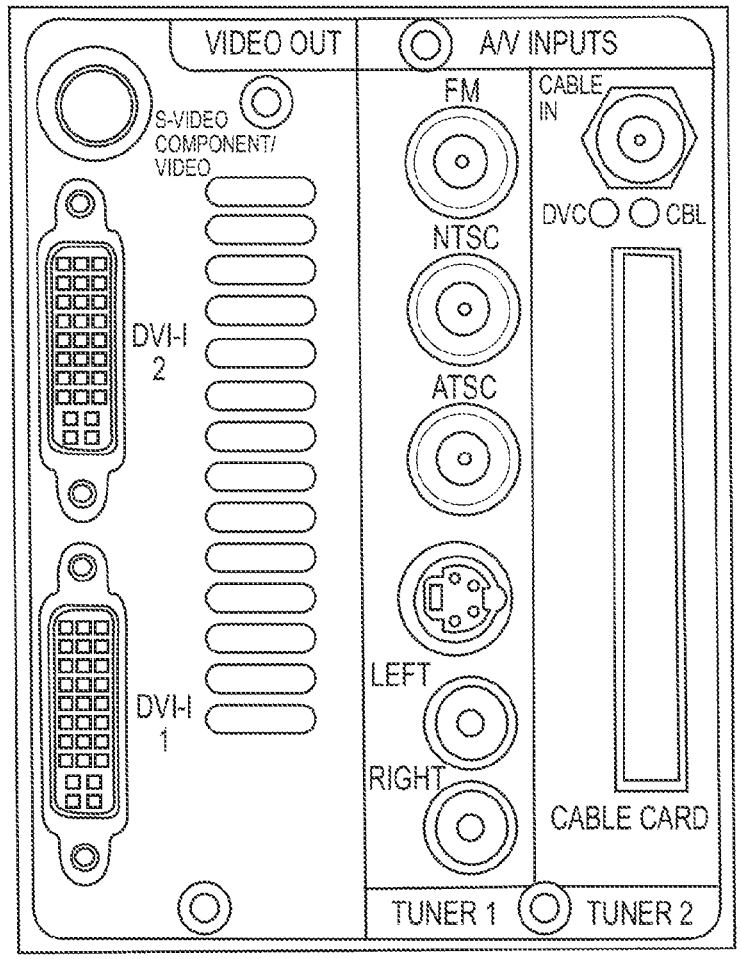
Figure 9F:
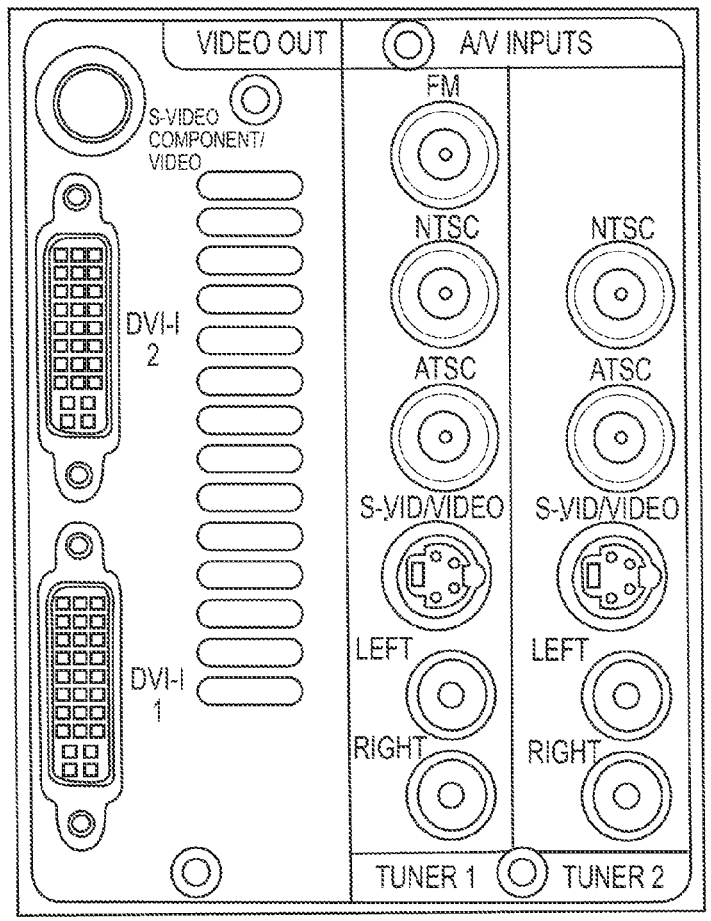
Figure 10A:
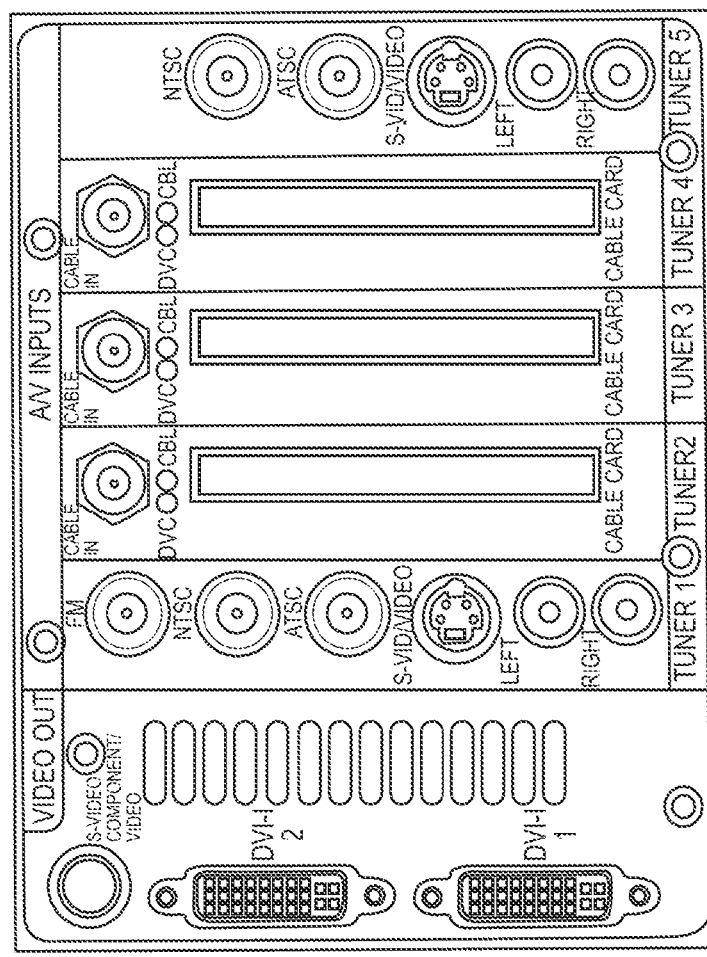
FIGS. 10A, 10B, 10C, 10D, 10E, 10F show various examples of an alternative media plate for the media control device, constructed in accordance with the disclosure.
Figure 10B:
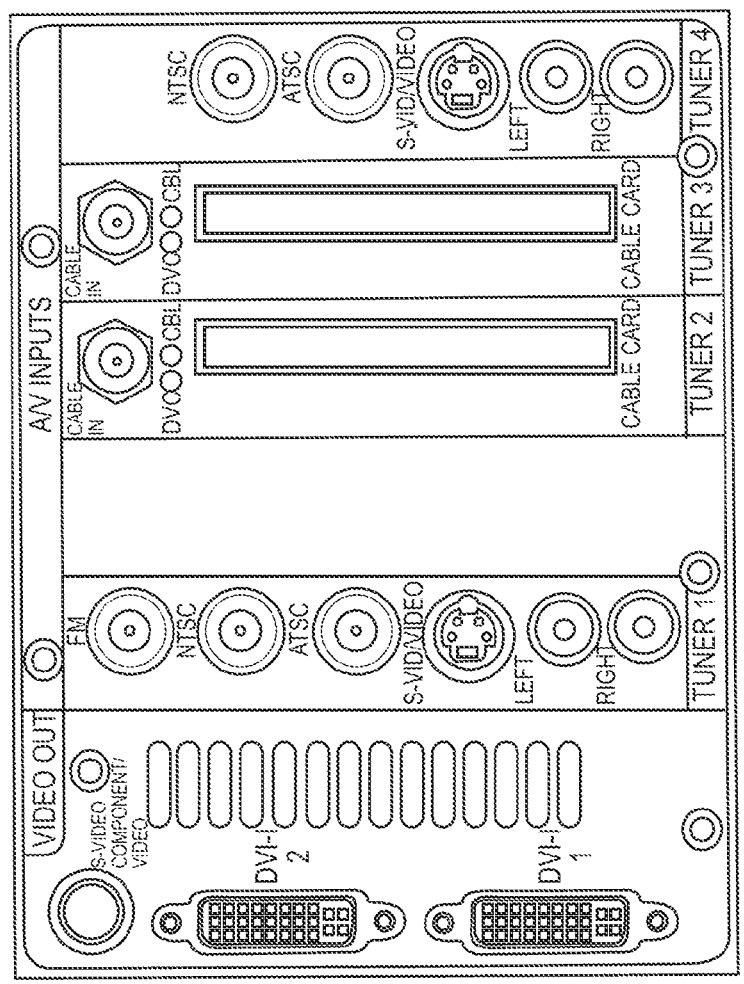
Figure 10C:
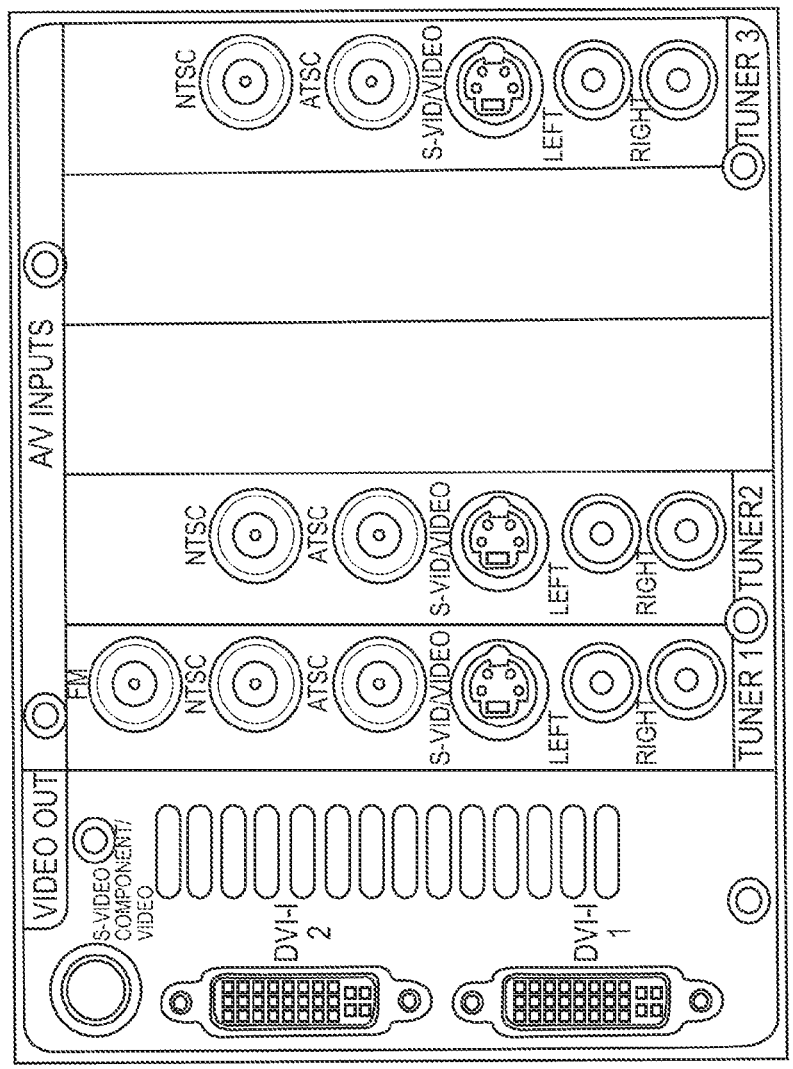
Figure 10D:
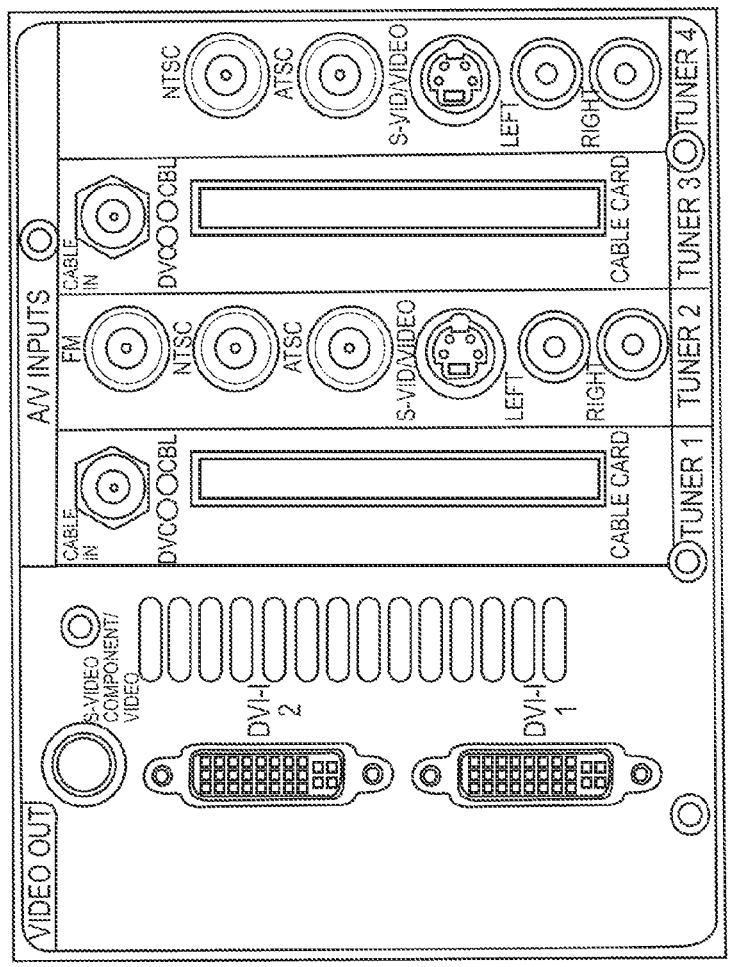
Figure 10E:
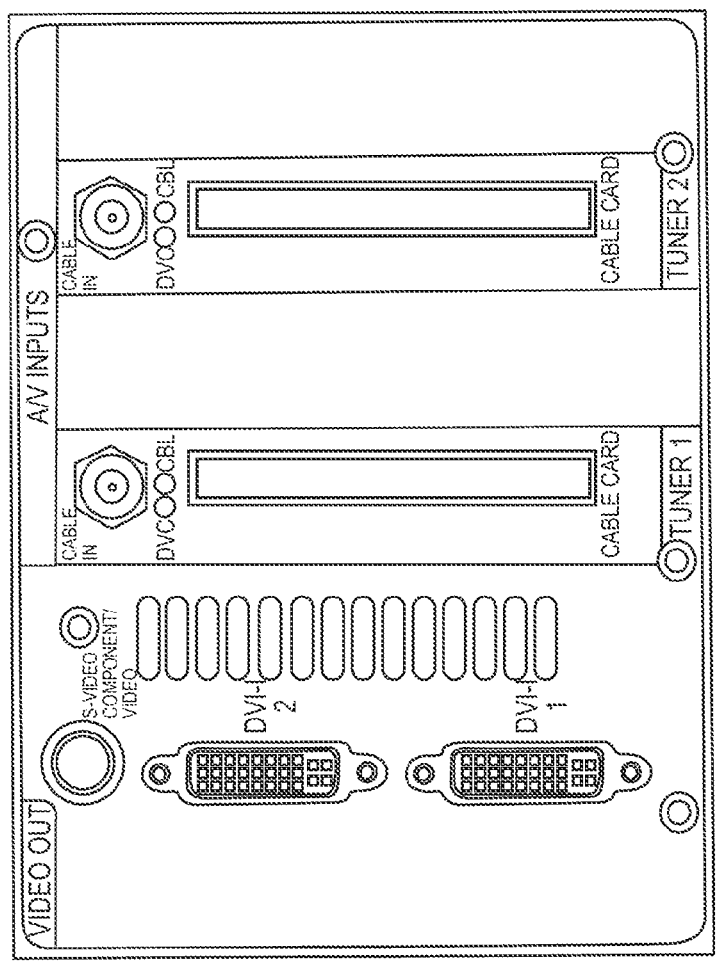
Figure 10F:
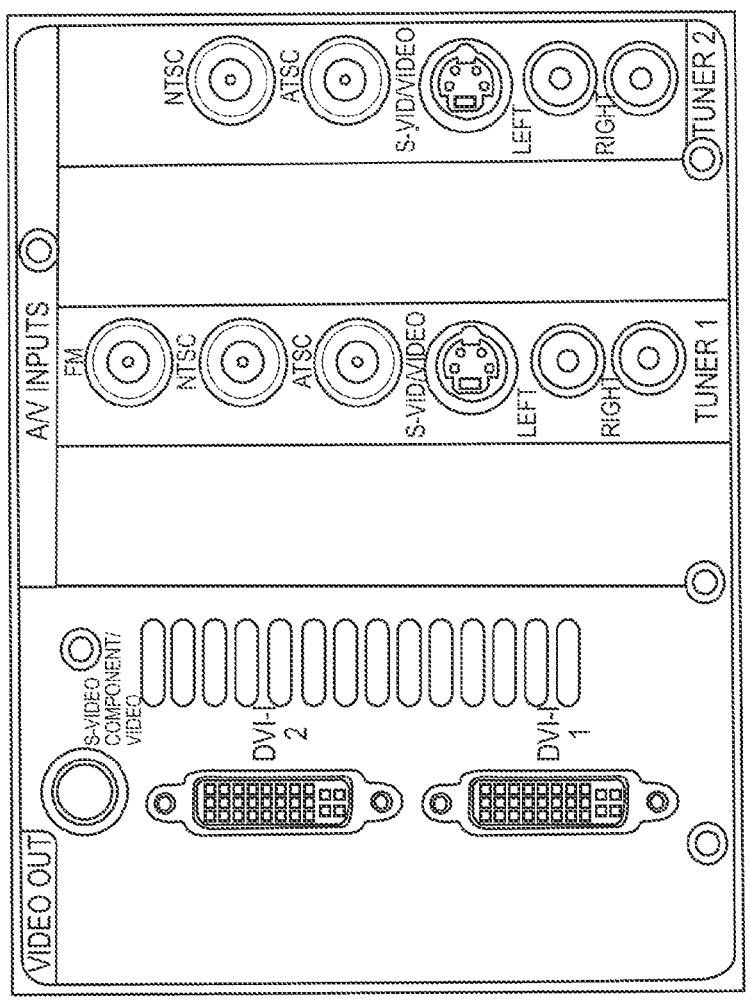

FIG. 8B shows a rear view of the media control device 300 (shown in FIG. 3) constructed with the four-space rack-mount unit 500 (shown in FIG. 6). Similar to FIG. 8A, the media control device 300 may include a media plate 570, which may include one or more media connectors 580. The media plate 570 may have a plurality of connection holes (or openings) 572 formed corresponding to the second connection holes (or openings) 562 of the flange 540 shown in FIG. 7B. The media plate 570 may be attached to the flange 540 by driving (or inserting) a plurality of screws 574 through the connection holes 572 of the media plate 570 and the second connection holes 562 of the flange 540.

The media plates 470 and 570 may be customizable depending on the media connection types of the media devices 220 (shown in FIG. 2) to be directly connected thereto. For example, the media plates 470 and 570 may be customizable based on a number and media connection types of the media devices 220 to be connected thereto. The media plates 470 and 570 may be customized to include any number of connectors in any connection types within a space limitation. For example, the media plates 470 and 570 may be produced to have certain numbers of audio connectors, video connectors and/or multiple signal connectors at desired locations thereof.

In an embodiment, the audio connector may include one of a Banana connector, a five-way binding posts with a banana plug, a Fahnestock clip, a DB25 connector, a DIN connector, a mini-DIN connector, an RCA connector, a Speakon connector, a TRS connector, an XLR connector, an ADAT connector, an AES/EBU connector, a S/PDIF connector and the like. The video connector may include at least one of a component video connector, a composite video connector, a DB13W3 connector, a DMS-59 connector, a Musa connector, a PAL connector, a SCART connector, an S-Video connector, an SDI connector, a VGA connector, a Mini-VGA connector, a BNC connectors, a DVI connector and a mini-DVI connector. The multiple signal connector may include at least one of a DisplayPort digital connector, an F connector, an HDMI connector, a SCART connector, a TRS connector and the like.

When one or more new media devices 220 are to be connected to the media control device 300 (shown in FIG. 3) and/or one or more new media devices 220 are disconnected from the media control device 300, the user may replace the media plates 470 and 570 with new ones with a desired set of connectors. For example, FIGS. 9A, 9B, 9C, 9D, 9E, 9F show various examples of the media plate 470 with different sets of connectors. Further, FIGS. 10A, 10B, 10C, 10D, 10E, 10F show various examples of the media plate 570 with different stets of connectors.

Referring to FIGS. 9A, 9B, 9C, 9D, 9E and 9F, the media plate 470 may include a portion for VIDEO OUT connectors and a portion A/V INPUTS for further connectors and/or slots (openings) for receiving cards, such as, for example, but not limited to cable cards. FIGS. 10A, 10B, 10C, 10D, 10E, 10F show various examples for the media plate 570, which may include a portion for VIDEO OUT connectors and a portion A/V INPUTS for further connectors and/or slots (openings) for receiving cards, such as, for example, but not limited to cable cards. It is noted, however, that the disclosure is no way limited to the examples shown in FIGS. 9A-9F, 10A-10F, but, instead, various other configurations and/or shapes may be used for the media plates 470, 570, including various other numbers of, types of or configurations of conneeters or openings, depending on an application of the disclosure.

Further, it is noted that the media control device 300 (shown in FIG. 3) may be reconfigurable so as to associate the various connectors that may be included in the media plates 470, 570 with the various components in the media control device 300 (such as, e.g., 320, 322, 326, 330, shown in FIG. 3).

Accordingly, in accordance with teaching principles of the disclosure, a media control device may control the functions and operations of the media devices connectable to an IP based network implemented with a WSD protocol. Thus, the media control device may converge and automate a group of the functions and operations of the media devices. Further, the media control device may be configured to be customizable depending on the connection types of the media device directly connected thereto. Thus, the media control device may also function as a media source device and/or a media destination device.

While the disclosure has been described in terms of examples of the embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A media system, comprising:
a network implemented with a Web Service for Device (WSD) protocol for enabling interpretable device to device interaction;
a plurality of media devices connectable to the network and configured to perform a plurality of media functions, each media device being configured to perform at least one of the plurality of media functions;
a media host connectable to the network and configured to at least partially control the plurality of media functions, wherein the media host is directly connectable to at least one of the plurality of media devices and comprises a media interface customizable depending on a connection type of the at least one media devices to be connected thereto;
the media interface comprises a media plate having a first group of connectors for at least one of receiving and outputting the media data; and
the media interface being configured to allow the media plate to be replaced with another media plate comprising a second group of connectors, different from the first group of connectors, for at least one of receiving and outputting the media data,
wherein the WSD protocol includes a WSD stack that comprises a first communication layer configured to logically interface the plurality of media devices, a second communication layer configured to physically interface the plurality of media devices, a service provider layer stacked between the first and second communication layers, one or more device bridges configured to translate communication, and a controller configured to communicate.

2. The media system of claim 1, wherein the plurality of media devices comprises at least one media source device configured to provide media data to the media system and at least one media destination device, which is configured to receive the media data.

3. The media system of claim 2, wherein the at least one media source device comprises at least one of a RF tuner, a CD player, a VCR, a cable outlet, a cable box, a satellite receiver, a camcorder, a digital camera, a DVD player, a Blu-ray DVD player, a HD DVD player, a portable media player, a data storage, a telephone and the Internet.

4. The media system of claim 3, wherein the at least one media destination device comprises at least one of a speaker system, a stereo system, a surround sound system, a monitor, a TV set, an image projection system, a data storage and a computer.

5. The media system of claim 2, wherein the media host is further configured to control traffic of the media data from the at least one media source device to the at least one media destination device.

6. The media system of claim 1, wherein each of the first group of connectors and the second group of connectors comprises at least one of an audio connector, a video connector and a multiple signal connector.

7. The media system of claim 1, wherein the audio connector comprises at least one of a Banana connector, a five-way binding posts with a banana plug, a Fahnestock clip, a DB25 connector, a DIN connector, a mini-DIN connector, an RCA connector, a Speakon connector, a TRS connector, an XLR connector, an ADAT connector, an AES/EBU connector and a S/PDIF connector.

8. The media system of claim 1, wherein the video connector comprises at least one of a component video connector, a composite video connector, a DB13W3 connector, a DMS-59 connector, a Musa connector, a PAL connector, a SCART connector, an S-Video connector, an SDI connector, a VGA connector, a Mini-VGA connector, a BNC connectors, a DVI connector and a mini-DVI connector.

9. The media system of claim 1, wherein the multiple signal connector comprises at least one of a DisplayPort digital connector, an F connector, a HDMI connector, a SCART connector, a TRS connectors.

10. The media system of claim 1, further comprising a plurality of non-media devices connectable to the network and configured to perform a plurality of non-media functions, each non-media device configured to perform at least one of the plurality of non-media functions.

11. The media system of claim 10, wherein the media host is further configured to converge the plurality of media functions and the plurality of the non-media functions.

12. The media system of claim 10, wherein the plurality of non-media devices comprises at least one of an intercom system, an ambient lighting system, a security system and a HVAC system.

13. A media host device, comprising:
a media processing system configured to process media data;
a housing comprising the media processing system;
a media interface unit configured to receive and output the media data from and to at least one media device, the media interface unit being customizable depending on the at least one media device;
the media interface unit is configured to be customizable depending on a number and connection types of the at least one media device;
the media interface unit comprises a first media plate comprising a first group of media connectors for at least one of receiving and outputting the media data;
the media interface unit is further configured to allow replacement of the media plate with a second media plate comprising a second group of media connectors, the second group of media connectors being different from the first group of media connectors for at least one of receiving and outputting the media data; and
a network that interfaces a network implemented with a Web Service for Device (WSD) protocol implemented with a WSD stack, wherein the WSD stack comprises a first communication layer configured to logically interface a plurality of media devices, a second communication layer configured to physically interface the plurality of media devices, a service provider layer stacked between the first and second communication layers, one or more device bridges configured to translate communication, and a controller configured to communicate.

14. The media host device of claim 13, wherein the housing comprises a flange configured to detachably and sequentially engage the first media plate and the second media plate.

15. The media host device of claim 14, wherein the flange comprises a plurality of first connection openings and each of the first media plate and the second media plate comprises a plurality of second connection openings arranged corresponding to the first connections openings, and wherein each of the first media plate and the second media plate is attachable to the flange by a plurality of screws inserted through the plurality of first connection openings and the plurality of second connection openings.

16. The media host device of claim 13, wherein each of the first group of the media connectors and the second group of the media connectors comprises at least one of an audio connector, a video connector and a multiple signal connector.

17. The media host device of claim 16, wherein the audio connector comprises at least one of a Banana connector, a five-way binding posts with a banana plug, a Fahnestock clip, a DB25 connector, a DIN connector, a mini-DIN connector, an RCA connector, a Speakon connector, a TRS connector, an XLR connector, an ADAT connector, an AES/EBU connector and a S/PDIF connector.

18. The media host device of claim 16, wherein the video connector comprises at least one of a component video connector, a composite video connector, a DB13W3 connector, a DMS-59 connector, a Musa connector, a PAL connector, a SCART connector, an S-Video connector, an SDI connector, a VGA connector, a Mini-VGA connector, a BNC connectors, a DVI connector and a mini-DVI connector.

19. The media host device of claim 16, wherein the multiple signal connector comprises at least one of a DisplayPort digital connector, an F connector, an HDMI connector, a SCART connector, a TRS connector.

20. The media host device of claim 13, wherein the media processing system comprises: a system board; a microprocessor connected to the system board; a memory connected to the system board; a data storage connected to the system board; and a network interface connected to the system board.

* * * * *